(12) United States Patent
Wicki et al.

(10) Patent No.: US 8,794,602 B2
(45) Date of Patent: Aug. 5, 2014

(54) METHOD OF MASS TRANSFER, STRUCTURED PACKING AND MASS TRANSFER APPARATUS FOR A SMALL LIQUID LOAD

(75) Inventors: Werner Wicki, Winterthur (CH); Markus Duss, Winterthur (CH); Ilja Ausner, Öhningen (DE)

(73) Assignee: Sulzer Chemtech AG, Winterthur (CH)

( * ) Notice: Subject to any disclaimer, the term of this patent is extended or adjusted under 35 U.S.C. 154(b) by 234 days.

(21) Appl. No.: 13/326,503

(22) Filed: Dec. 15, 2011

(65) Prior Publication Data

US 2012/0160102 A1    Jun. 28, 2012

(30) Foreign Application Priority Data

Dec. 22, 2010  (EP) .................................... 10196386

(51) Int. Cl.
*B01D 47/14*   (2006.01)
*B01J 19/30*   (2006.01)

(52) U.S. Cl.
USPC ........ 261/100; 261/94; 261/DIG. 72; 96/290; 96/296

(58) Field of Classification Search
None
See application file for complete search history.

(56) References Cited

U.S. PATENT DOCUMENTS

| | | | | |
|---|---|---|---|---|
| 2,610,893 | A * | 9/1952 | Collins et al. | 442/417 |
| 4,022,596 | A * | 5/1977 | Pedersen | 55/528 |
| 5,607,743 | A * | 3/1997 | Disselbeck | 428/131 |
| 6,631,890 | B1 * | 10/2003 | Lau | 261/94 |
| 2004/0229343 | A1 * | 11/2004 | Husain et al. | 435/262 |
| 2005/0035473 | A1 * | 2/2005 | Manteufel | 261/97 |
| 2007/0216044 | A1 * | 9/2007 | Tushaus et al. | 261/94 |
| 2010/0000411 | A1 * | 1/2010 | Wertz et al. | 96/12 |

* cited by examiner

*Primary Examiner* — Duane Smith
*Assistant Examiner* — Pankti Patel
(74) *Attorney, Agent, or Firm* — Francis C. Hand; Carella, Byrne et al.

(57) ABSTRACT

A method of mass transfer includes the steps of: supplying a first fluid and a second fluid into a mass transfer apparatus, wherein the mass transfer apparatus includes a vessel which has a head region, a base region and a mass transfer region, wherein the first fluid is brought into contact with the second fluid at least in the mass transfer region, wherein the mass transfer region is arranged between the head region and the base region and the mass transfer region includes a structured packing which includes a plurality of neighboring layers of fabric which includes fiber strands of a non-metallic material. The mass transfer apparatus is operated at a fluid load of at most 3 $m^3/m^2/h$.

11 Claims, 5 Drawing Sheets

Figure 1:
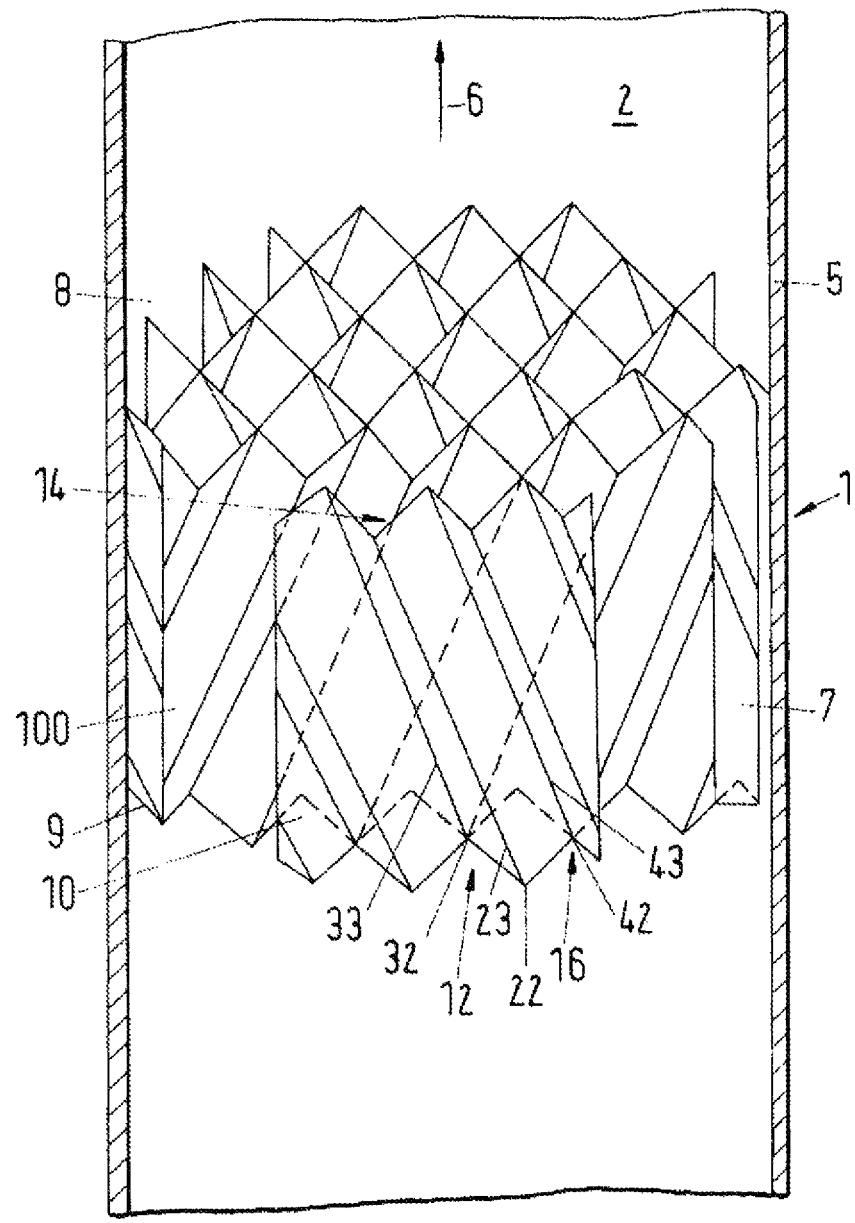

METHOD OF MASS TRANSFER, STRUCTURED PACKING AND MASS TRANSFER APPARATUS FOR A SMALL LIQUID LOAD

The invention relates to a method of mass transfer, to a structured packing which is used in the method of mass transfer, as well as to a mass transfer apparatus having the structured packing for a small liquid load. In particular, the mass transfer apparatus can be designed as an absorption apparatus or as a distillation column.

Structured packings are used as installations in mass transfer apparatuses, such as for example distillation columns or absorption columns. They serve for the improvement of the mass transfer between gases and liquids, in particular in applications in which the liquid load is low and/or the surface tension of the liquid is high. A structured packing is typically constructed of thin-walled elements arranged in a regular predefined arrangement on which the fluid is present as drops or film. These thin-walled elements are arranged in the mass transfer apparatus such that they can be flowed through by gas. The gas comes into contact with the liquid, which is present on the surface of the thin-walled element, when it flows through the mass transfer apparatus. During this contact a component enriched in the gas can transfer into the liquid or vice versa, this means that a mass transfer can take place. The amount of mass transfer per unit time is proportional to the boundary surface of the gas and of the liquid. The boundary surface is larger the larger the proportion of the surface of the packing is which is wetted by the liquid.

For the method of mass transfer, i.e. for example the distillation method or the absorption method, structured packings are used to generate an as large as possible mass transfer surface between two fluids. For this purpose, the one fluid flows directly onto the packing surface as liquid and the other fluid flows in the packing passages, formed by the thin-walled elements, in counter-flow as a gas phase. Both fluids are in direct contact with one another and at their phase boundary surfaces exchange/transfer energy and/or mass with one another. For this reason it is necessary for an ideal mass transfer and/or energy exchange that the liquid is present on the overall packing surface made available to form an as large as possible phase boundary surface.

Precisely this necessity is, however, for example; not always satisfied for low liquid loads. A low liquid load means that precisely so much liquid is guided through the mass transfer apparatus so that, in the best case, the packing surface of the structured packing is wetted as a film, this means that the overall packing surface of the packing forms a phase boundary surface. The liquid volume flow per column surface area is understood to be the liquid load L. In particular in applications having very small liquid loads in combination with badly wetted liquids having high surface tensions, this means, for example for watery systems, it happens that only a fraction of the packing surface is wetted with liquid and the phase boundary surface for the energy transport and mass transport is thereby drastically reduced.

A good wettability is given by structured packings having a cross-passage structure of pleated fabric layers. Such a cross-passage structure is described, for example, in DE 1442714.

In accordance with GB 451014, fabrics having fiber materials which have a high capillarity due to their very small distances between fibers and for this reason have a very good wettability have been found to be particularly advantageous. Such fiber materials can, for example, be composed of glass or basalt in accordance with EP 531255 A1. To ensure the mechanical stability of a structured packing made of a fiber material the fibers were webbed together with other materials such as wires of steel or of plastic, as is shown in DE 1442714 or in DE 2434082 or is also spanned onto a corresponding frame construction as is detailed in DE 1769739.

Fabric packings are also advantageously used for the application in watery systems. For example, a plurality of packings made of pure metal fabrics are thus mentioned in EP 2119713 A1 for the distillation of a watery system. In U.S. Pat. No. 7,411,098 little fabric packings are also provided for the watery distillation.

From EP-A-1477224, a cross passage packing is known which is made of a metal fabric which is operated with a low specific fluid load. The specific fluid load is determined by the ratio of the fluid load L to the specific surface a of the packing. In accordance with EP-A-1477224, the ratio of L/a lies below a maximum value of 10 l/mh. The specific surface a is defined as the ratio of the surface of the packing to the volume which is taken by the packing. The ratio of L/a is also referred to as edge load. As a rule a large edge load leads to a good wetting of the surface of the packing, as a specific amount of liquid is incident on a small region of the surface of the packing. However, a small edge load arises for the same fluid load and much larger areas of the surface of the packing and, in the normal case, leads to a significantly worse wetting of the surface of the packing made available.

It has, however, been shown that such a packing made of a metal fabric generates a film in the form of a narrow band on the packing surface, this means only a very small proportion of the packing surface is wetted when the fluid load is small and/or the liquid has a large surface tension, this means preferably has a surface tension larger than 30 mN/m, in particular larger than 50 mN/m.

Document EP 0416 649 A describes a fabric layer for a structured packing, according to which capillary active threads in the weft threads have a good wetting behavior, that means the liquid can be distributed better in horizontal direction. This is obtained by weft threads made of a non-metallic material. The packing or column filler elements gain according to EP 0416 649 A a self separation capacity and make separate liquid distributors superfluous. The fabric layer according to EP 0416 649 A has according to searches performed by the applicant never found any commercial application. Moreover a liquid distributor has to be basically present to distribute the liquid phase uniformly onto the packing, thus the advantage cited in EP 0416 649 A appears not to have had proved its practical worth. Any comparison between the fabric layer of the invention with the fabric layer of EP 0416 649 A is thus not possible for the reasons mentioned above.

A packing element for a catalytic reactor is also shown in document EP 1 308 204 A1 showing a cross channel packing. A fabric layer is arranged between neighboring layers of the cross-channel packing. The fabric layer is used for the performance of the catalysis and is formed as an intermediate layer. The intermediate layer may have a wave profile and can form a cross channel packing with a neighboring layer forming a supporting packing. Warp threads and weft threads of this intermediate layer can contain fabric threads. The problem to be solved according to EP 1 308 204 A1 has been to provide a layer, by which the catalysis can be performed, thus it is not required to increase the wettability of the packing surface. Fabric layers of similar configuration would have to be foreseen, which should be arranged next to each other and contact each other at contact points to influence each other mutually. Such an interaction is not possible for a packing element according to EP 1 308 204 A1, as no neighboring fabric layers are foreseen. The fabric layers are arranged between membranes of a defined shape, thus the fabric layers are not arranged next to each other.

For this reason it is the object of the invention to provide a method of mass transfer, as well as a structured packing for carrying out the method of mass transfer, as well as a mass transfer apparatus for carrying out the method of mass transfer, wherein the proportion of the wetted packing surface can be increased by means of the structured packing.

This object is satisfied by means of a method of mass transfer which includes the following steps: supplying a first fluid and a second fluid into a mass transfer apparatus, wherein the mass transfer apparatus includes a vessel which has a head region, a base region and a mass transfer region, wherein the first fluid is brought into contact with the second fluid at least in the mass transfer region, wherein the mass transfer region is arranged between the head region and the base region and the mass transfer region includes a structured packing which includes a plurality of neighboring layers of fabric which includes fiber strands of a non-metallic material. The mass transfer apparatus is operated at a fluid load of at most 3 $m^3/m^2h$, preferably at a fluid load at most 0.5 $m^3/m^2h$. The neighboring layers are arranged next to each other.

In particular, one of the first fluid or the second fluid has a surface tension of at least 30 mN/m, preferably of at least 50 mN/m.

According to the method in accordance with the previous embodiments, the fluid includes water, amines, amides, in particular dimethyl formamide, monohydric or polyhydric alcohols, in particular alcohols of fatty acids, monoethylene glycol, diethylene glycol, triethylene glycol, tetraethylene glycol, monomers of plastics, in particular MDI (diphenyl methane diisocyanate), DMT (dimethyl terephtalate), carboxylic acids, in particular fatty acids, esters, in particular fatty acid esters or mixtures with at least two of the previously mentioned components.

A structured packing for a mass transfer apparatus in accordance with the invention has a head region and a base region. The structured packing includes a plurality of neighboring layers which form each an upper side which faces the head region and which layers form each a bottom side. The bottom side faces the base region. The layer has a wall element which extends between the upper side and the bottom side. The wall element is formed as a fabric which includes fiber strands of a non-metallic material which are formed as weft threads, wherein the weft threads have a yarn count of at least 100 g/1000 m and the weft threads include at least 20 yarns/25.4 mm.

In accordance with a preferred embodiment at least two fiber strands made of a non-metallic material are arranged directly adjacent to one another. In particular, the specific surface of the packing amounts to from 0 $m^2/m^3$ up to at most 500 $m^2/m^3$.

Metal wires can be arranged between the fiber strands of non-metallic material. The weft threads can be interwoven by warp threads, wherein at least a part of the warp threads is made of metal wires. The fiber strands of non-metallic material can include glass, basalt or a polymer. The metal wires preferably include stainless steel, titanium, hastelloy, duplex, tantalum or can have a coating. The coating can, in particular serve for the increase of the corrosion resistance.

The structured packing in accordance with a preferred embodiment has a layer having a wall which has a wavelike section, through which a plurality of open channels are formed which extend from the upper side of the packing to the bottom side of the packing, wherein the channels include a first wave trough, a first wave crest and a second wave crest. The first wave crest and the second wave crest bound the first wave trough. The first wave crest and the second wave crest have a first peak and a second peak.

In particular, the mass transfer apparatus includes a structured packing in accordance with one of the previous embodiments. The mass transfer apparatus can, in particular be configured as an absorption apparatus or as a distillation column.

The mass transfer apparatus in accordance with one of the previous embodiments has a head region, a base region and a mass transfer region arranged between the head region and the base region, wherein a fluid distributor is arranged in the mass transfer apparatus such that the first fluid can be distributed onto the upper side of the structured packing by means of the fluid distributor, the first fluid is applicable on the wall surface of the layers of the structured packing as a film and in this respect can be brought into contact with a second fluid flowing in reverse flow with regard to the first fluid. The fluid includes in particular water, amines, amides, in particular dimethyl formamide, monohydric or polyhydric alcohols, in particular alcohols of fatty acids, monoethylene glycol, diethylene glycol, triethylene glycol, tetraethylene glycol, monomers of plastics, in particular MDI (diphenyl methane diisocyanate), DMT (dimethyl terephtalate), carboxylic acids, in particular fatty acids, esters, in particular fatty acid esters. The fluid can, in particular also include mixtures of at least two of the aforementioned components. In this respect the term polyhydric, in particular also includes the term bivalent, i.e. also includes a diol.

A structured packing in accordance with one of the following embodiments leads to an improved exploitation of the packing surface in comparison to the metal fabrics used so far.

As pure metal fabrics only have a low capillarity, the fabric includes a layer which includes fiber strands of a non-metallic material which are configured as weft threads.

Additionally pure metal fabrics are significantly more cost intensive in their acquisition in comparison to a fabric packing having at least a portion of fiber strands.

The invention includes a mass transfer apparatus having a structured packing manufactured from a fabric including metal wires and fiber strands which, in particular for distillation applications and absorption applications having very small fluid loads of at most 3 $m^2/m^2h$ preferably of at most 0.5 $m^3/m^2h$ and watery systems, leads to an increase of the phase boundary surface and therefore enables a higher energy transfer and/or an improved mass transfer in comparison to common structured packings. The hybrid fabric packing is, in particular, advantageous for applications in which the edge load is smaller than 10 l/mh, in particular smaller than 2 l/mh. The lower boundary value for the edge load advantageously lies at least 0.2 l/mh.

Figure 2:
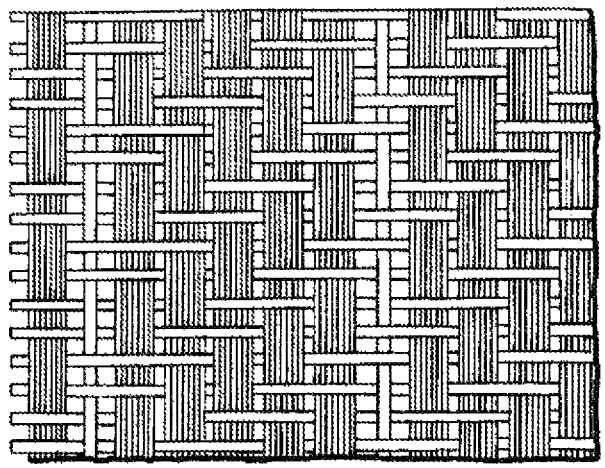
Figure 3:
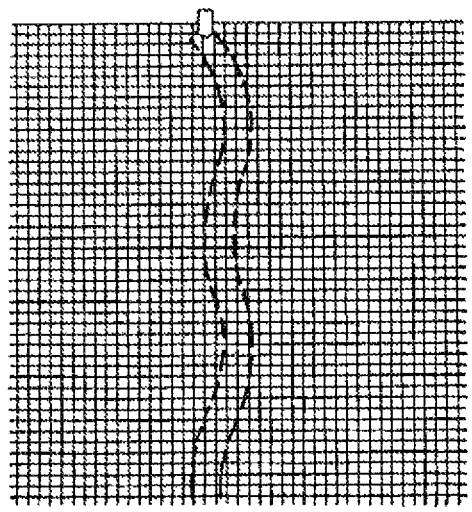
Figure 4:
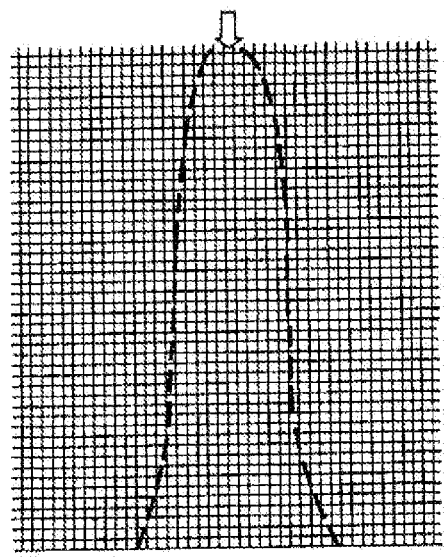
Figure 5:
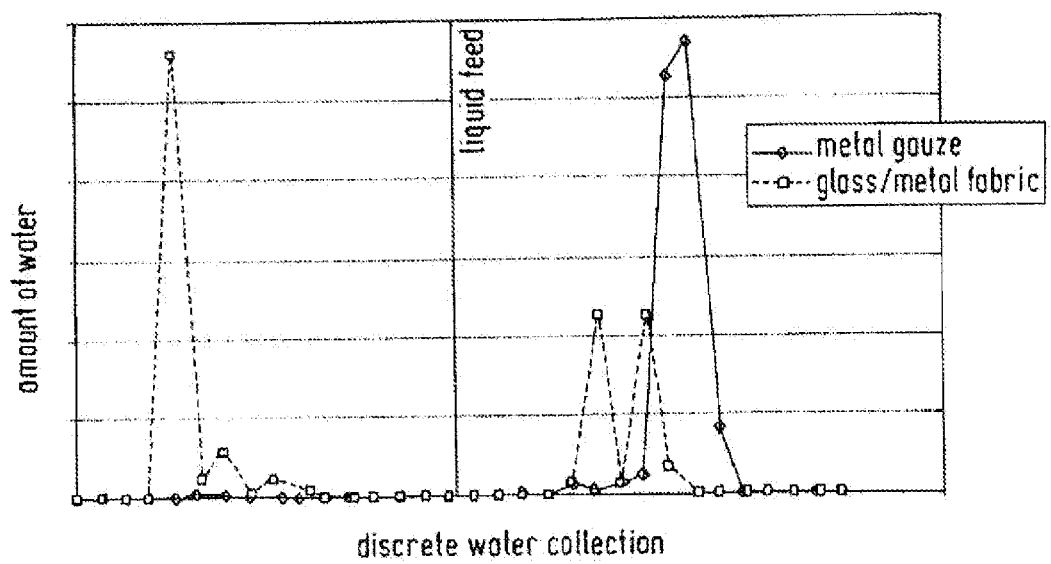
Figure 6:
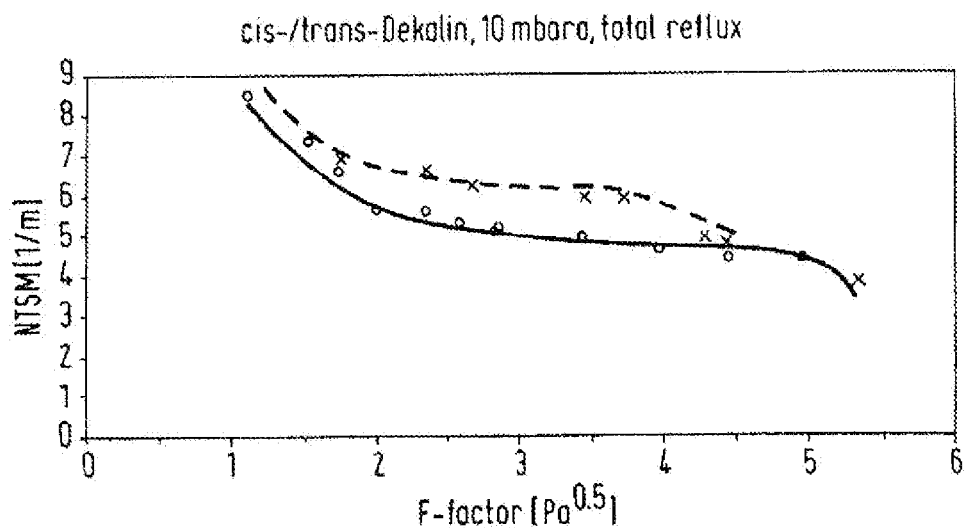
Figure 7:
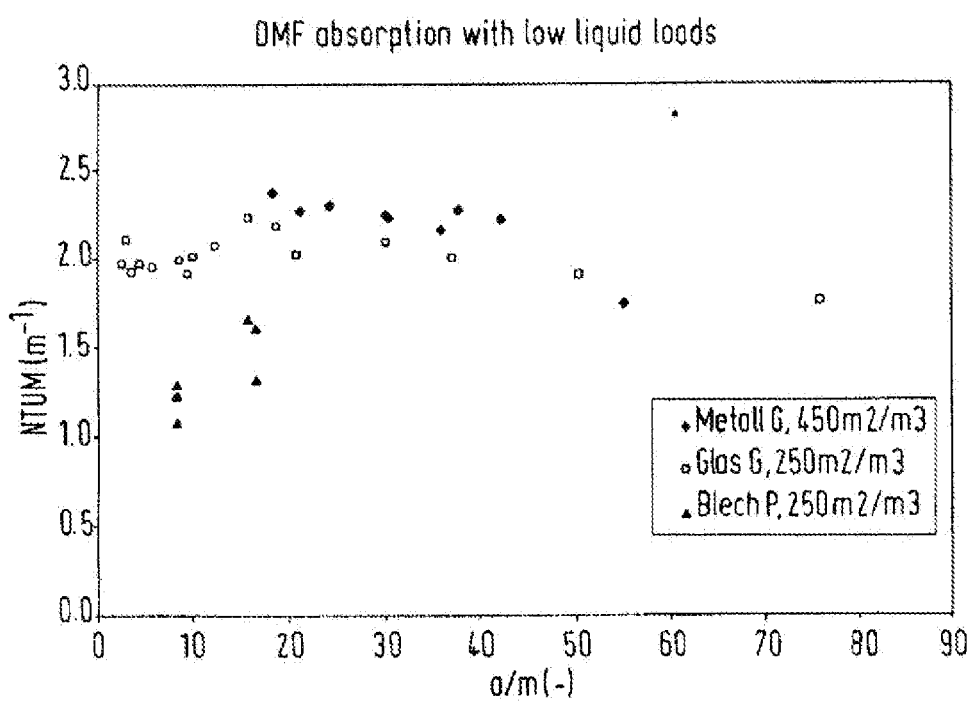
Figure 8:
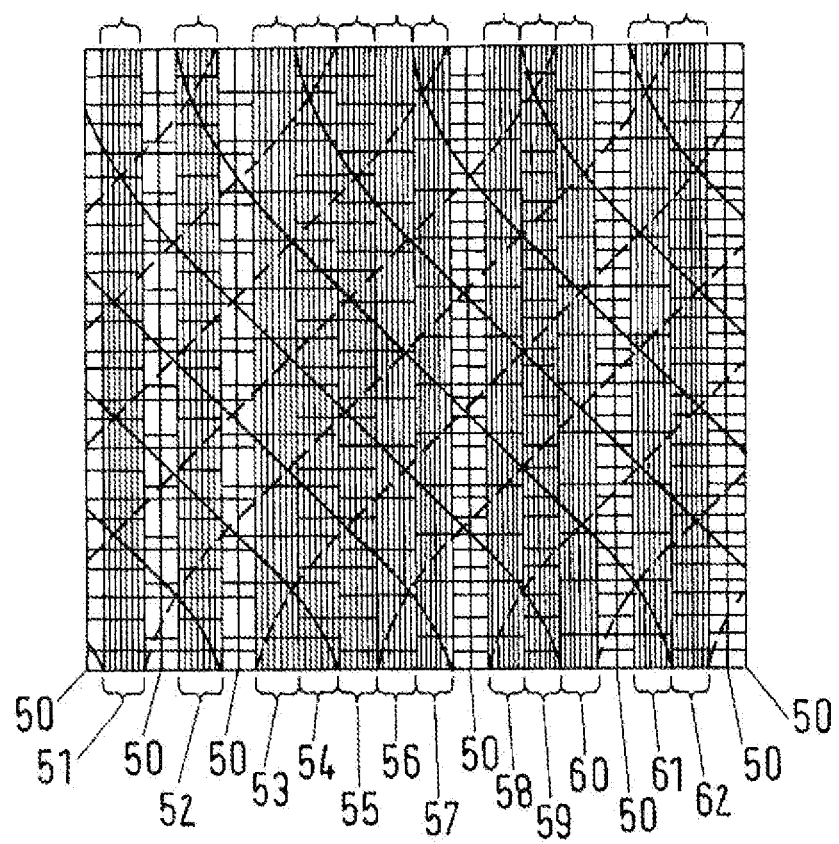

In the following the invention will be explained with reference to the drawings. There is shown:

FIG. 1 a mass transfer apparatus which includes a structured packing in accordance with the invention;

FIG. 2 an embodiment of a structured packing in accordance with the invention;

FIG. 3 an illustration of the wetting of a common structured packing;

FIG. 4 an illustration of the wetting of a structured packing in accordance with the invention;

FIG. 5 an illustration of a distribution of the liquid of the packing in accordance with the invention in comparison to a packing known from the prior art;

FIG. 6 a comparison of the separation performance of the packing in accordance with the invention to the prior art;

FIG. 7 a comparison of a sheet metal packing, a metal fabric packing and a hybrid fabric packing for the absorption of DMF; and FIG. 8 a variant of the packing in accordance with the invention.

FIG. 1 shows a mass transfer apparatus which includes a structured packing 7. The structured packing 7 includes a few layers 10, 100 which form a packing body. A means for mass transfer between two fluid phases is understood to be a structured packing 7. The structured packing 7 is used in a mass transfer apparatus 2. The mass transfer apparatus can be configured, in particular as a column 5, which can be used for distillation, rectification, absorption or desorption.

The mass transfer apparatus has a head region and a base region. The structured packing 7 includes at least a layer 10, 100 which forms an upper side which faces the head region and a bottom side which faces the base region. The layer has a wall element which extends between the upper side and the bottom side.

As a rule, the structured packing 7 includes a plurality of layers 10, 100 which are associated with one another in a regular repetitive geometric relationship. The distance of neighboring layers can be selected as an example for this geometric relationship. The distance between neighboring layers can have the same value periodically due to the geometric relationship so that from the sum of the layers a structure arises which is characterized by the same or at least periodically equal separation distances. The periodicity is found in the overall structured packing, whereby the packing obtains a regular structure. The structure can, in particular be configured as wave-like section.

The layers 10, 100 in accordance with FIG. 1 are composed of thin-walled elements which have a wave-like section. The wave-like section is characterized by a periodically reoccurring sequence of elevations, i.e. wave crests and valley-like wells i.e. wave troughs. This wave-like section can be configured, in particular as a folding with a zigzag section having tapered edges or having wave crests and/or having wave troughs with a radius. The layers are arranged relative to one another such that the wave-like section of two neighboring layers is tilted at an angle to the main flow direction. For this reason the wave-like sections of neighboring layers 10, 100 are arranged cross-wise to one another.

The first layer 10 and the second layer 100 are each composed of a wall element which is configured as fabric which includes strands of non-metallic material. In this respect such a wall element can include the overall length or, however, only form a part of this. The wall element can have the shape of a planar plate. Alternatively hereto, the wall elements can have a wave-like section, in particular have a zigzag section or a wave-like section with rounded peaks and valley bottoms.

The first layer 10 and the second layer 100 are shown in a view in FIG. 1 which shows the upper side 8 of the packing 7. The upper side 8 of the packing 7 is essentially arranged normal to the main flow direction 6. The flow direction in which a more volatile fluid flows is referred to as the main flow direction 6, in particular a gas flowing upwards in the column without insertions, i.e. a gas flowing in the direction of the head of the column 5. The direction opposing the main flow direction is the direction in which a less volatile fluid flows, this generally means a liquid which flows through the column without insertions, i.e. flowing in the column in free fall. The flow direction can locally deviate from the main flow direction in the packing, as the flow can be deflected by the layers in the packing.

The first layer 10 of the structured packing 7 has a wave-like section, wherein a plurality of open channels 12, 14, 16 are formed by the wave-like section. The channels further include a first wave trough 22, a first wave peak 32 and a second wave peak 42. The first wave peak 32 and the second wave peak 42 bound the first wave trough 22. The first wave peak 32 and the second wave peak 42 have a first crest 33 and a second crest 43. The first wave through 22 has a valley bottom 23. The first wave trough 22 has a valley bottom 23, wherein the normal distance from the first crest 33 to the valley bottom 23 of the wave through 22 is equal to the normal distance of the second crest 43 to the valley bottom 23 of the wave trough 22.

The normal distance between the first crest 33 of the first wave peak 32 and the valley bottom 23 of the first wave trough 22 is also referred to as wave height. The wave height is equal to the normal distance. In a layer in accordance with the shown embodiment of the invention, the wave height is essentially constant, this means it less in a region of typical tolerances which lie in a region of 0.5 mm.

The second layer 100 of the structured packing 7 has a wave-like section, wherein the wave-like section is configured like the section of the layer 10, but is tilted at a different angle to the main flow direction.

In FIG. 2, a section of a wall element of a layer of a structured packing in accordance with the invention is illustrated. Individual lamella-shaped pleated layers form a cross channel structure when they are placed beside one another, as is shown in FIG. 1. The layer 10 is composed of metal wires in the one weaving direction and of fiber strands of a non-metallic material, for example of fiber strands of glass or of basalt in the other weaving direction. Advantageously the metal wires are warp threads, the fiber strands advantageously form the weft threads. In this respect, the metal wires ensure a sufficient mechanical deformability and stability of the pleated layers and the fiber strands ensure the high capillarity, which leads to the desired wettability.

The weft threads have a yarn strength of at least 100 g/1000 m which corresponds to 100 tex. The weft threads for this yarn strength include at least 20 yarns/25.4 mm (=1 inch).

The fiber strands of non-metallic material can in particular include fiber strands of glass, of basalt or of polymers. Metal wires can be interwoven in addition to the fiber strands of non-metallic material to increase the resistance of the layer against chemical influences, such as, for example corrosion, or thermal influences, such as, for example temperature, or mechanical influences; such as, for example pressure. The metal wires can include stainless steel, titanium, hastelloy, duplex, and tantalum or include a coating.

For the improvement of the wetting, at least two fiber strands of a non-metallic material can be arranged directly beside one another.

Advantageously also three, particularly preferably five fiber strands can be arranged directly next to one another as is shown in FIG. 2. Metal wires can in turn be arranged between a plurality of fiber strands of non-metallic material. When the three fiber strands are arranged directly next to one another, the hybrid fabric packing is configured, in particular as a three shaft fabric, when five fiber strands are arranged directly next to one another, the hybrid fabric is configured, in particular as a five shaft fabric.

The weft threads are interwoven by warp threads, wherein at least a part of the warp threads is configured as metal wires. Preferably, the orientation of the weft threads occurs in the main flow direction.

How well the fabric layer is wetted becomes evident in a wetting trial using a water trickle, as is illustrated in FIG. 3 and FIG. 4; an unpleated layer having a pure metal fabric and an unpleated layer of fabric in accordance with the invention are spanned perpendicular and a water trickle is selectively applied at the upper boundary. In this respect, "unpleated" means that the layer has a planar surface. For this layer of pure metal fabric, it has been found that the water trickle predominantly moves on the fabric surface and is not absorbed by the fabric, see FIG. 3. The expansion of the trickle is small and the trickle width approximately corresponds to the width at the point of application over the overall running length.

In contrast to this, an expansion of the trickle takes place on the fabric of the fabric layer having fiber strands as is shown in FIG. 4. From the point of application, the water is sucked into the fabric and expands in and on the fabric. The flow not only takes place on the fabric surface, but predominantly also takes place in the interior of the fabric. For this application, this circumstance signifies a higher phase boundary surface and an increased retention time for the liquid in the packing.

When the volume flow of the liquid increases, the excess liquid correspondingly flows along the outer surfaces of the fabric. Hereby, the retention time of the liquid on the fabric is reduced from up to a plurality of minutes to a few seconds. Accordingly, in particular, for systems in which the speed of the mass transfer is essentially dependent on the retention speed in the liquid, a mass transfer cannot take place or only takes place partially so that either a larger packing height is required or a plurality of packings must be arranged. Such a system is also referred to as liquid limiting, as it is the retention speed of the transfer component into the liquid which determines the amount of mass transfer per unit time.

FIG. 5 shows the distribution of a liquid flow on the bottom side of a plurality of pleated layers of a structured packing for a metal fabric and a mixed fabric with weft threads which include fiber strands of glass fibers. In this respect, a layer having a wave-like section is understood as a pleated layer as is described in association with FIG. 1. The flowing liquid preferably has a large surface tension, the liquid can in particular be water. The distribution of the liquid over the edge-length of the layer is shown on the abscissa. The edge length is the width of the layer, i.e. the extension of the layer in a plane which runs normal to the main flow direction, this means runs in the direction of the longitudinal axis of the mass transfer apparatus.

The amount of water which is collected and measured in a certain region of the edge length is shown on the ordinate. The point of application of the liquid is located approximately in the center of the abscissa. A vertical line shows the position of the liquid introduction onto the packing layers, i.e. analog to the point of application of FIG. 3 or 4.

The distribution of the liquid is shown as a solid line for the metal fabric, for the hybrid fabric the distribution of the liquid is shown as a dotted line. The liquid flow is deflected by the tilted channels of the cross channel structure as is shown in FIG. 3 or FIG. 5. Interestingly the liquid only experiences a deflection from the main flow direction on the metal fabric, and indeed in the direction of the open channels of the pleated layer onto which the liquid is applied. A transfer of the liquid flow to neighboring layers apparently does not occur. The distribution of the liquid lies in a narrow region which corresponds to the flow behavior shown in FIG. 3.

The liquid on the hybrid fabric does not distribute itself in accordance with a preferred direction, but rather the distribution takes place relatively uniformly on the left and on the right half of the edge and the tilts of the neighboring channels at approximately equal proportions. From this, the conclusion can be drawn that the liquid experiences an improved expansion due to the fiber strands. The fiber strands are wetted by the liquid, a liquid flow is formed within the fiber strands as well as on the layer surface of the packing. Neighboring layers absorb the liquid, more easily at the touching points. Thus, the liquid can more easily reach from one layer to a neighboring layer and for this reason is distributed better over the layer.

This sucking effect is not present in the metal fabric packing. For this reason, an inferior distribution of the fluid flow takes place in this fabric, which is confirmed by the unilateral distribution of the liquid in FIG. 5 for the metal fabric.

A further test is carried out in a distillation column having an internal diameter of 250 mm and several meters of packing height; the very well known test system cis/trans-Dekalin (U. Onken, W. Arlt: "Recommended test mixtures for distillation columns", The Institution of Chemical Engineers, 1990) is separated by distillation at 10 mbar head pressure and total reflux. The specialty at this low head pressure respectively this high vacuum is the occurrence of very small fluid loads in the region of at most 3 $m^3/m^2h$, preferably at most 0.5 $m^3/m^2h$. A significantly improved separation performance with the fabric packing with fiber strands is found specifically for this region with regard to a pure metal fabric packing of equal geometry as is illustrated in FIG. 6. FIG. 6 shows the number of separation steps per meter NTSM in dependence on the speed of the more volatile fluid within the column, which is expressed by the F factor. The F factor is given by the root of the density of the second fluid multiplied by the speed with which the second fluid flows through the mass transfer apparatus. In this respect the second fluid is the more volatile fluid whose flow direction runs from the base region to the head region of the mass transfer apparatus. The solid line indicates the number of separation steps per meter (NTSM) for a structured packing which is configured as a pure metal fabric, the dotted line indicates the NTSM for a structured packing of the equal geometric dimension and shape which is configured as fabric with fiber strands.

Both for the metal fabric packing and also for the fabric packing having fiber strands of a non-metallic material it is true that for smaller F factors the number of the theoretical separation steps per meter increases.

The fabric packing with fiber strands of a non-metallic material is characterized by a high number of theoretical separation steps per meter. Thereby, it is shown that a higher separation efficiency is achieved by this structured packing.

A further application example is the washing section of an absorption apparatus for $CO_2$. Such absorption apparatuses are typically configured as absorption columns. Frequently amines are used in an absorption column for the separation of $CO_2$ from exhaust gas flows. These indeed possess a low vapor pressure, but are still found in small concentrations in exhaust gas freed of $CO_2$ in accordance with the vapor pressure of the amines used. To reduce this unwanted amine discharge so-called washing sections are installed at the end of such absorption columns in which the amines are again washed out of the exhaust gas flow with water.

Such washing sections typically work in a structured packing at high water loads to cause a sufficient wetting of the structured packing. The water is guided in a circuit to ensure the high water load. This circuit is also referred to as recirculation (pump around). The fresh water supply must be maintained low so that the water balance can be maintained and no large waste water flows arise. In this respect the liquid is collected at the lower end of the structured packing, is taken away as a side flow and for the most part is uniformly redistributed at the upper end of the structured packing onto the structured packing by means of liquid distributors. The gas flow cannot be purified to an arbitrary small amine concentration by the re-guiding of the watery liquid loaded with amines. If one were to exclusively operate the described washing section with fresh water the resulting fluid loads would be so small that a very large packing height would result. The pressure loss would also increase due to the required large packing height which would lead to a higher cost of operation for the described application.

These washing sections can now be efficiently operated at very small fluid loads with a structured packing in accordance with the invention: precisely so much water is guided through the structured packing to ensure a sufficient wetting. The fluid load lies between 0.03 $m^3/m^2h$ and 0.5 $m^3/m^2h$. A significantly lower amine concentration in the exiting gas flow can be achieved with the reduced amount of water, but amine-free water, than compared to the above described recirculation, as amines have a very small vapor pressure and are very water-soluble. Additionally the pressure loss of the washing section is reduced to a minimum due to the use of the structured packing in accordance with the invention. Furthermore, further savings with regard to investment cost and operation cost arise, as no circulation pump is required and the liquid does not have to be collected and removed at the lower end of the structured packing.

In accordance with a further preferred embodiment, the absorption of dimethyle formamid (DMF) from air is carried out in water. Since DMF is highly soluble in water only small amounts of water are required for the absorption. Water is brought into contact with a gas containing the DMF for carrying out the absorption. The larger the contact surface between the water and the gas is, the faster the DMF can transfer into the water from the gas. This contact surface corresponds to the mass transfer surface. The mass, here DMF, is transported on the overall mass transfer surface from the gas into the water. The mass transfer surface is typically made available by the structured packing. The water distributes itself along the structured packing in that it forms a thin film which covers the surface of the structured packing.

The result of this measurement is shown in FIG. 7 which shows the number of the transfer units per meter (NTUM) as a function of the absorption factor (A/m) for different packing types. The absorption factor provides the ratio between the gradient of the operation line A and the equilibrium line m in the equilibrium diagram (x-y-diagram). Hereby the gradient of the operation line A is calculated from the ratio of the mol flow of the heavy volatile fluid to the mol flow of the light volatile fluid.

A structured packing in accordance with the invention is in the following referred to as hybrid fabric packing GlasG, a metal fabric packing in the following referred to as MetalIG and a sheet metal packing in the following referred to as BlechP were used as packing types.

The following table provides the specific surfaces a of the used packing types:

| Type | a[$m^2/m^3$] | Setup |
| --- | --- | --- |
| GlasG □ | 250 | Fabric having weft threads of glass fiber |
| MetalIG ◇ | 450 | Metal fabric |
| BlechP Δ | 250 | Sheet metal |

The graph shows that the hybrid fabric packing has a similar absorption efficiency to a metal fabric packing. This efficiency of the hybrid fabric packing is, however, achieved with approximately half the specific surface.

In comparison, the sheet metal packing provides a reduced number of separation steps per meter or NTUM (number of transfer units per meter) with the same specific surface as the hybrid fabric packing, this can be explained by the inferior wetting of the sheet metal packing.

From the ratio of the specific surface 2:1 for MetalIG: BlechP it would be expected that the number of the theoretical separation steps per meter would be approximately double as large for the metal fabric packing NTUM (MetalIG) as the number of the theoretical separation steps per meter NTUM (BlechP). The number of theoretical separation steps per meter for the metal fabric packing NTUM (MetalIG) actually, however, is only 1.6 times the number of the theoretical separation steps per meter NTUM for the sheet metal packing (BlechP). This can be explained by an inferior exploitation of the specific surface which is due to the smaller edge load for the metal fabric MetalIG.

The edge load is larger for a sheet metal packing BlechP than for a metal fabric packing of the type MetalIG, as the fluid load L remains the same in both cases, however, the surface of BlechP is much smaller than that of MetalIG, which is also documented in prior art mentioned in the introduction.

In accordance with the theory, NTUM (GlasG) must be the same as NTUM (BlechP) as the specific surfaces are equal. The results achieved in accordance with FIG. 7, however, show a factor of 1.5 between these packings for NTUM. As this factor can obviously not be explained by the difference of the specific surface, the improvement must be achieved through the use of a fabric which includes fiber strands of a non-metallic material and for this reason has an improved wetting.

For the hybrid fabric packing of type GlasG, the threads used as the weft threads have a yarn count as stated in the subsequent listing: glass fiber (GF, 136 tex) having a yarn count of 136 g/1000 m or basalt fiber (BF, 577 tex) 577 g/1000 m. The arrangement of the strands for the formation of the fabric is explained in the following listing:

In accordance with a first variant, the fabric is composed of a glass fiber (GF) having a yarn count as provided above and includes metal wires of stainless steel periodically arranged between the glass fiber, wherein the wire thickness of the metal wires is 0.16 mm. The density of the fabric in this arrangement amounts to 0.616 kg/$m^2$. In this case 70.6 yarns/25.4 mm (=1 inch) are arranged in the warp direction and 40.9 yarns/25.4 mm (=1 inch) are arranged in the weft direction.

In accordance with the second variant, the fabric is composed of a basalt fiber (BF) having a yarn strength as provided above and metal wires of stainless steel periodically arranged between the glass fibers, wherein the wire strength of the metal wires amounts to 0.16 mm. The density of the fabric amounts to 0.923 kg/$m^2$ in this arrangement. In this case 70.6 yarns/25.4 mm (=1 inch) are arranged in the warp direction and 25.7 yarns/25.4 mm (=1 inch) are arranged in the weft direction.

Surprisingly, for a fabric which includes at least one of the two mentioned fiber strands, a nearly as high a number of theoretical separation steps can be found per meter as for the metal fabric packing (MetalIG) having nearly the double specific surface.

A particularly advantageous embodiment of a hybrid fabric packing is shown in FIG. 8. A layer of the hybrid fabric packing shown in FIG. 8 has a lower boundary zone, a middle zone and an upper boundary zone. The boundary zones are located at the upper side and the bottom side of the layer when the layer is inserted as a part of a structured packing into a mass transfer apparatus. The boundary zones are configured such that the angle to the main flow direction is smaller than in the middle zone. In particular, the angle can continuously increase from a minimum value up until the tilting angle of the channels of the middle zone is achieved with regard to the main flow direction. The flow resistance of the corresponding boundary zones is reduced with regard to the middle zone by the particular design of the upper and lower boundary zones. The minimum value of the angle can, in particular amount to 0° so that the tangent at the curvature of the channel at the edge is parallel to the main flow direction.

Also, different combinations of fiber strands of a non-metallic material and metal wires are shown in FIG. 8. For example, the fiber strands 51, 52 can be arranged alternatively to the metal wires 50. Alternatively hereto, as is already shown in FIG. 2, the fiber strands 53, 54, 55, 56, 57 can be arranged directly bounding one another. Also, a smaller number than five fiber strands can be arranged bounding one another, for example three fiber strands, referred to in FIG. 8 with 58, 59, 60 or two fiber strands, referred to in FIG. 8 with 61, 62 can be arranged bounding one another.

In conclusion, it has thus been shown that the hybrid fabric packing is very suitable for liquids, which distribute themselves inferiorly on typical structured packings. Furthermore, the hybrid fabric packing is suitable for applications with very low fluid loads.

The term "fiber strand" as used herein means a fiber strand composed of several filaments, for example, the fiber strand 51 of FIG. 8 has 7 filaments. Also, the orientation of the weft threads of the structured packing occurs in the main flow direction, i.e. vertically, in a mass transfer apparatus.

What is claimed is:

1. A structured packing for a mass transfer apparatus comprising
a plurality of neighboring layers having an upper side for facing a head region and a bottom side for facing a base region,
each said layer defining a well element extending between said upper side and said bottom side and being formed as a fabric including fiber strands of a metallic material and fiber strands of a non-metallic material which are formed as weft threads having a yarn count of at least 100 g/1000 m and said weft threads including at least 20 yarns/25.4 mm.

2. A structured packing as set forth in claim 1 wherein at least two fiber strands made of a non-metallic material are arranged directly adjacent to one another.

3. A structured packing as set forth in claim 1 wherein the specific surface area of said packing amounts to at most 500 $m^2/m^3$.

4. A structured packing as set forth in claim 1 wherein each said layer includes metal wires arranged between the fiber strands of non-metallic material.

5. A structured packing as set forth in claim 1 wherein the weft threads are interwoven with warp threads with at least a part of the warp threads being made of metal wires.

6. A structured packing as set forth in claim 1 wherein the fiber strands of non-metallic material are made of at least one of glass, basalt and a polymer.

7. A structured packing as set forth in claim 1 wherein each said layer includes metal wires arranged between the fiber strands of non-metallic material, said metallic wires being made of stainless steel, titanium, hastelloy, duplex and tantalum.

8. A structured packing as set forth in claim 1 wherein each said layer includes metal wires arranged between the fiber strands of non-metallic material, said metallic wires having a coating thereon.

9. A structured packing as set forth in claim 1 wherein said wall of each said layer has a wave-like section defining a plurality of open channels extending from said upper side to said bottom side and including a first wave trough, a first wave crest and a second wave crest, wherein the first wave crest and the second wave crest bound the first wave trough, wherein the first and second wave crest have a first peak and a second peak.

10. A structured packing as set forth in claim 1 wherein each said layer is vertically disposed and said weft threads of non-metallic material are vertically disposed.

11. A structured packing as set forth in claim 1 wherein said weft threads have a capillarity sufficient to draw water into the interior of each respective layer of said plurality of neighboring layers.

* * * * *